US007587207B2

(12) United States Patent
Davies et al.

(10) Patent No.: US 7,587,207 B2
(45) Date of Patent: Sep. 8, 2009

(54) DATA DELIVERY THROUGH BEACONS

(75) Inventors: Robert J. Davies, Horley (GB); Saul R. Dooley, Reigate (GB)

(73) Assignee: IPG Electronics 503 Limited, St. Peter Port (GG)

( * ) Notice: Subject to any disclaimer, the term of this patent is extended or adjusted under 35 U.S.C. 154(b) by 1859 days.

(21) Appl. No.: 09/876,515

(22) Filed: Jun. 7, 2001

(65) Prior Publication Data

US 2002/0002034 A1    Jan. 3, 2002

(30) Foreign Application Priority Data

Jun. 26, 2000  (GB)  .................... 0015454.2
Aug. 15, 2000  (GB)  .................... 0020073.3

(51) Int. Cl.
*H04W 24/00* (2006.01)
(52) U.S. Cl. .................. 455/456.1; 455/456.5; 455/457
(58) Field of Classification Search .................. 455/457, 455/456.1, 456.5
See application file for complete search history.

(56) References Cited

U.S. PATENT DOCUMENTS 5,835,861 A * 11/1998 Whiteside ................... 455/466
6,169,498 B1 * 1/2001 King et al. ................ 340/686.1
6,311,060 B1 * 10/2001 Evans et al. .............. 455/426.1
6,782,253 B1 * 8/2004 Shteyn et al. ............ 455/414.1

FOREIGN PATENT DOCUMENTS

EP        0752793 A2    8/1997
EP        1006684 A2    7/2000

* cited by examiner

*Primary Examiner*—Quoc D Tran
*Assistant Examiner*—Karen L Le
(74) *Attorney, Agent, or Firm*—Volpe and Koenig, P.C.

(57) ABSTRACT

A communications system comprises at least one beacon device capable of wireless message transmission and at least one portable device capable of receiving such a message transmission. The beacon is arranged to broadcast a series of inquiry messages each in the form of a plurality of predetermined data fields arranged according to a first communications protocol, such as Bluetooth. For the delivery of additional data via broadcast, and in particular data including location information, the beacon adds to each inquiry message prior to transmission an additional data field carrying broadcast data, with the portable device receiving the transmitted inquiry messages including the location data and reading the broadcast data from the additional data field.

11 Claims, 3 Drawing Sheets

DATA DELIVERY THROUGH BEACONS

The present invention relates to services offered to users of electronic equipment, especially but not exclusively to users of mobile communications devices such as portable telephones and suitably equipped PDA's (personal digital assistants). The invention further relates to means for delivery of such services, and to portable devices for receiving them.

Recent years have seen a great increase in subscribers world-wide to mobile telephone networks and, through advances in technology and the addition of functionalities, cellular telephones have become personal, trusted devices. A result of this is that a mobile information society is developing, with personalised and localised services becoming increasingly more important. Such "Context-Aware" (CA) mobile telephones are used with low power, short range base stations in places like shopping malls to provide location-specific information. This information might include local maps, information on nearby shops and restaurants and so on. The user's CA terminal may be equipped to filter the information received according to pre-stored user preferences and the user is only alerted if an item of data of particular interest has been received.

An example of a CA terminal is given in U.S. Pat. No. 5,835,861 which discloses the use of wireless telephones within the context of advertisement billboards. The user of a wireless telephone obtains the telephone number of a vendor by activating his/her wireless telephone to transmit a prompt signal to an active advertisement source and to receive from the advertisement source a response signal containing the telephone number of the advertising vendor. The telephone number can then be used to automatically place a call to that vendor via the public switched telephone network. Alternatively, the telephone number can be stored for use later on. This arrangement can be used to place a call to a vendor without having to either memorise the telephone number or to write it down. The signals between the billboard and the caller can be transmitted as modulated infrared (IR) signals.

In another example, Hewlett-Packard has posted a publication on the Web at <http://www.cooltown.hp.com/papers/webpres/WebPresence.htm> about their "Cooltown" project. The convergence of Web technology, wireless networks and portable client devices provides design opportunities for computer/communications systems. In the Cooltown project, systems that are location-aware can be created using URL's for addressing, physical URL's for delivery via beacons and sensing of URL's for discovery, and localised web servers for directories. The systems are ubiquitous to support nomadic users. On top of this infrastructure the Internet connectivity can be leveraged to support communications services. Web presence bridges the World Wide Web and the physical world inhabited by the users, providing a model for supporting nomadic users without a central control point.

The Cooltown Museum and Bookstore offers visitors a Web-enhanced experience. As visitors tour the museum, their portable digital assistant (PDA) can receive Web URLs from wireless "beacons". These beacons are small infrared transceivers located close to pictures or sculptures; the URLs link into a Web of information about the items. Using the PDA's Web browser, visitors can read or hear about the artist or the work and about related art works in the museum. The URLs can also be stored as bookmarks for further study or they can be used to select reproductions of the artwork from the museum's online store.

It will be recognised that an important requirement for CA devices is that they quickly and efficiently gather data from beacons such that the user is not required to undertake actions such as staying close to a beacon whilst contact is established between portable device and beacon, nor having to specifically initiate interaction (as is the case with the above-mentioned system in U.S. Pat. No. 5,835,861). A further requirement is that the portable device should be kept relatively simple insofar as the data gathering from beacons is concerned: in the Cooltown system, a full web browser and display capability is required to support user navigation within the web page indicated by the URL being broadcast.

It is therefore an object of the invention to provide a system for the delivery of data via beacons whereby the amount of dedicated circuitry and operating procedure are kept to low levels.

In accordance with a first aspect of the present invention there is provided a communications system comprising at least one beacon device capable of wireless message transmission and at least one portable device capable of receiving such a message transmission, wherein the beacon is arranged to broadcast a series of inquiry messages each in the form of a plurality of predetermined data fields arranged according to a first communications protocol, wherein the beacon is further arranged to add to each inquiry message prior to transmission an additional data field, and wherein the at least one portable device is arranged to receive the transmitted inquiry messages and read data from said additional data field, the additional data field including location information. By adding the additional field (suitably at the end of a respective inquiry message), data broadcast may be carried on top of an existing inquiry process, such that the usual delays while such a process is carried out prior to data transfer are avoided. Furthermore, by placing the additional field at the end of those sent according to the communications protocol (preferably but not essentially Bluetooth), those protocol-compatible devices not intended for reception of beacon signals can simply ignore the additional data without compromising operation according to protocol.

Where the protocol is Bluetooth (or a similar frequency hopping arrangement) the beacon may be configured to broadcast a series of inquiry messages on a predetermined clocked succession or sequence of frequencies, with clock information for the beacon being carried by the additional data field. In one arrangement, the additional data field may carry at least 64 bits of data. As will be described in greater detail hereinafter with respect to embodiments of the invention, this can improve the inquiry performance of a Bluetooth system, shortening the time to establish a connection for data exchange.

The beacon may be arranged to include an indication in one of said predetermined data fields (suitably in a currently unused or unassigned field), said indication denoting the presence of said additional data field, such that devices configured for reception of beacon data may be triggered to read from the additional data field.

Where the first communications protocol comprises Bluetooth messaging, a special Dedicated Enquiry Access Code (DIAC) may be used to indicate the presence of location information in the additional data field.

The presence of location information in the additional data field may be indicated by header information appearing in the additional data field.

The communications system may perform wireless message transmission and reception using a scheme which employs frequency hopping. In this case, location data may be sent on each frequency used for inquiry message broadcasts.

The beacon may be arranged to include in a message first comparison data, with the portable device further comprising storage means holding second comparison data and comparator means arranged to identify when there is a match between the first and second comparison data and present the data read from the additional data field, otherwise to not present the data. Such second comparison data may be predetermined and/or pre-stored, or it may be determined adaptively from user profiling of the portable device user.

That is, means may be provided for generating said second comparison data from user profiling of the portable device user.

The comparator means may be a programmable device operable to perform, in synchronous or overlapping manner, comparisons between respective sets of first and second comparison data.

Also in accordance with the present invention there is provided a mobile communication device for use in the system recited above, the device comprising a receiver capable of receiving a short-range wireless inquiry message including a plurality of data fields according to a first communications protocol, means for determining when an additional data field including location information has been added to said plurality of data fields, and means for reading the location information data from such an additional data field.

Further in accordance with the present invention, there is provided a beacon device capable of wireless message transmission and for use in a communications system comprising said beacon device and at least one portable device capable of receiving such a message transmission, wherein the beacon is configured to broadcast a series of inquiry messages each in the form of a plurality of predetermined data fields arranged according to a first communications protocol, and to add to each inquiry message prior to transmission an additional data field, such as to enable the at least one portable device arranged to receive the transmitted inquiry messages to read data from said additional data field, the additional data field including location information. As described in relation to the system as a whole, the beacon device may be arranged to add said additional data field at the end of a respective inquiry message; it may be arranged to include an indication in one of said predetermined data fields, said indication denoting the presence of said additional data field; the first communications protocol may comprise Bluetooth messaging; and the device may be configured to broadcast a series of inquiry messages on a predetermined clocked succession of frequencies, with clock information for said beacon being included in data carried by said additional data field.

Still further in accordance with the present invention, there is provided a method for enabling the user of a portable communications device to receive broadcast messages wherein at least one beacon device broadcasts a series of inquiry messages each in the form of a plurality of predetermined data fields arranged according to a first communications protocol, wherein the beacon adds to each inquiry message prior to transmission an additional data field carrying broadcast message data, including location information, and wherein the portable device receives the transmitted inquiry messages, including the location information, and reads the broadcast data from said additional data field.

These and other aspects and optional features of the present invention appear in the appended claims, to which reference should now be made and the disclosure of which is incorporated herein by reference or will become apparent from reading the following description of the preferred embodiments of the invention.

Preferred embodiments of the invention will now be described, by way of example only, and with reference to the accompanying drawings, in which.

In the following description we consider particularly a CA application which utilises Bluetooth protocols for communication of messages from beacon to portable device (whether telephone, PDA or other). As will be recognised, the general invention concept of including a broadcast channel as part of the inquiry procedure is not restricted to Bluetooth devices, and is applicable to other communications arrangements, in particular frequency hopping systems.

Figure 1:
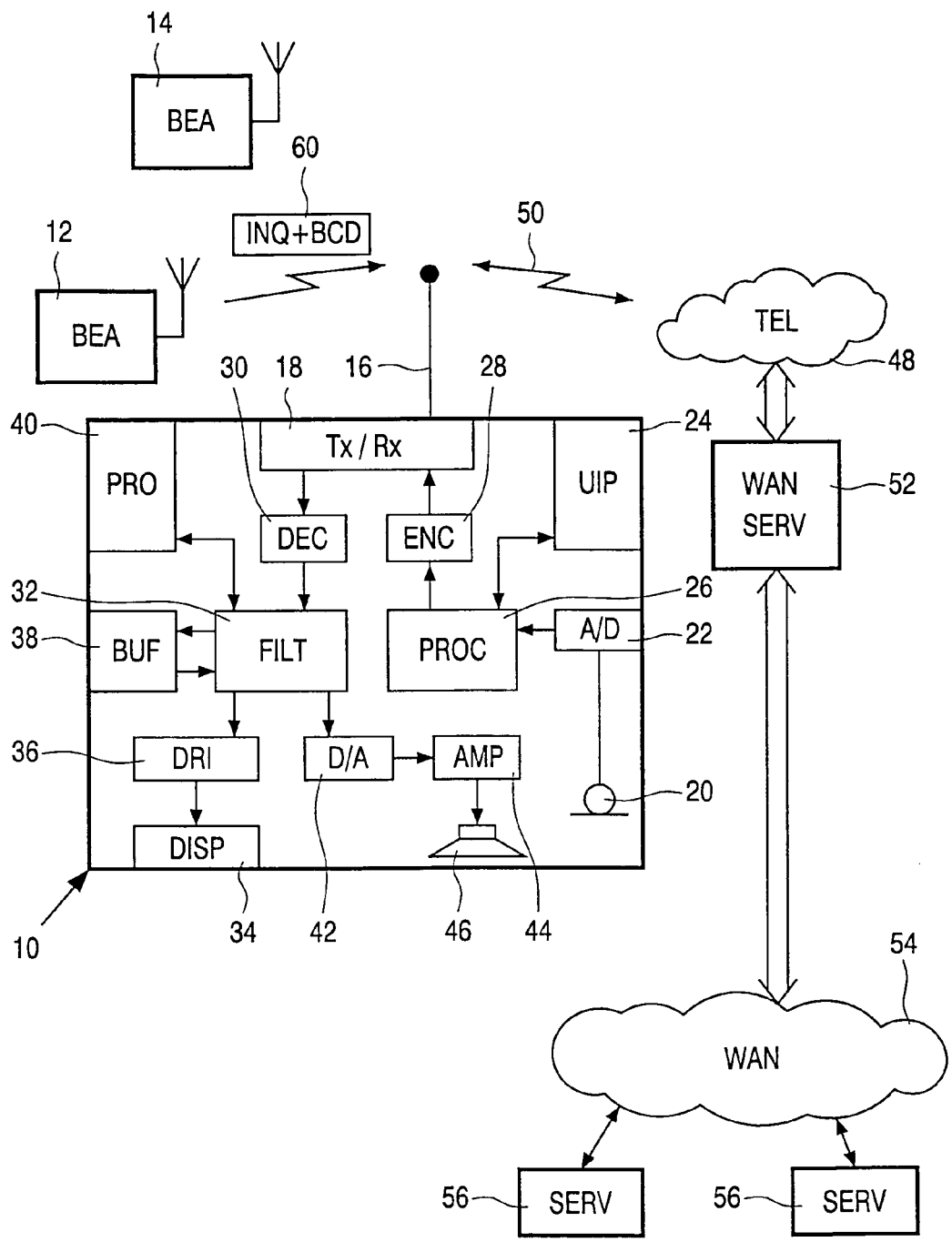
FIG. 1 is a block schematic diagram of a beacon and portable device embodying the invention.

FIG. 1 is a block schematic diagram of a CA mobile telephone 10 in use with one or more low power, short range base stations or beacons 12, 14. As mentioned previously, and discussed in greater detail below, such an arrangement may be used in places like shopping malls to provide location-specific information such as local maps, information on nearby shops and restaurants and so on, with the beacon downloading information keys to a mobile device. As will be discussed in greater detail below, the arrangement may also be used to provide location information itself, for example mapping co-ordinates or the like. An information key is a small data object that provides a reference to a source of full information, and it is in the form of a number of predetermined fields, one of which may contain a short piece of descriptive text presented to a user. Another field will be a pointer or address of some form, for example a URL or telephone number. Other supplementary fields may control how the data is presented to a user and how the address may be exploited. The beacon will generally broadcast cyclically a number of these keys, each typically relating to a different service.

Issues relating to the beacon construction and configuration include the beacons range which will be dependent on output power (typical range being 1 mW to 100 mW), levels of local interference, and receiver sensitivity.

The user's CA terminal 10 comprises an aerial 16 coupled with transceiver stage 18 for the reception and transmission of messages. Outgoing messages result from user input to the telephone, either audio input via microphone 20 and A/D converter 22 or other data input via the keypad or other input means 24. These inputs are processed to message data format by signal and data processing stage 26 and converted to transmission format by encoder 28 before being supplied to the transceiver stage 18.

Messages received via the aerial 16 and transceiver 18 are passed via a decoding stage 30 to a filtering and signal processing stage 32. If the data carried by the message is for presentation on a display screen 34 of the telephone, the data will be passed to a display driver 36, optionally after buffering 38, with the driver formatting the display image. As will be recognised, the display 34 may be a relatively simple low-resolution device, and the conversion of received data to display data may be carried out as a subset of the processing stage 32 functionality, without the requirement for a dedicated display driver stage.

Where the message is carrying data from one or other of the beacons 12, 14, the telephone has the ability to filter the information received according to pre-stored 40 user preferences and the user is only alerted (i.e. the information will only be retained in buffer 38 and/or presented on screen 34) if comparison of stored preference data and subject matter indicators in the message indicate that an item of data of particular interest has been received.

For conventional audio messages, the audio data is output by the filter and processing stage 32, via D/A converter 42 and amplifier 44 to an earphone or speaker 46. Receipt of such messages from the telephone network 48 is indicated by arrow 50: the telephone network 48 also provides the link from the telephone 10 to a wide-area network (WAN) server 52 and, via the WAN 54 (which may be the internet), to one or more remote service providers 56 providing a source of data for the telephone 10.

Communication between the CA terminal (telephone 10) and the CA base station (beacon 12) takes two forms: 'push' and 'pull'. In 'push' mode, information is broadcast by the beacons 12, 14, to all portable terminals 10 in the form of short 'keys' indicated at 60. The keys will take various forms according to the application but will generally include a concise description of the information being sent and a pointer to fuller information, e.g. a URL identifying one of the service providers 56.

Keys are received by the terminal 10 'unconsciously', that is, without direct intervention by the user, and automatically filtered according to the user's pre-set preferences. This filtering may be done by a comparator function applied in processing stage 32. Suitably, the processing stage is operable to apply the comparator function in multiple simultaneous or overlapping copies such as to process in parallel the relatively large number of keys that may be received. Some will be discarded, some kept for further study, others might cause the user to be alerted immediately. By way of example, shops might choose to push details of special offers into passing terminals in the knowledge that users who have interest and have therefore set their filters 32 accordingly will be alerted by their terminal.

Sometimes the user will wish to obtain more information than is contained in the keys. Here, 'pull' mode allows a user to set up a connection with a server 56 (which need not necessarily be specially configured for CA use) and actively request information to pull down into the terminal 10. This mode is therefore typically interactive.

Whilst base stations or beacons will typically be independent of one another (in a shopping mall set up, each shop provides and maintains its own beacon without reference to any beacons provided by neighbouring shops), the beacons may be wholly or partially networked with at least some coordination as to their broadcast messages.

Figures 2, 3:
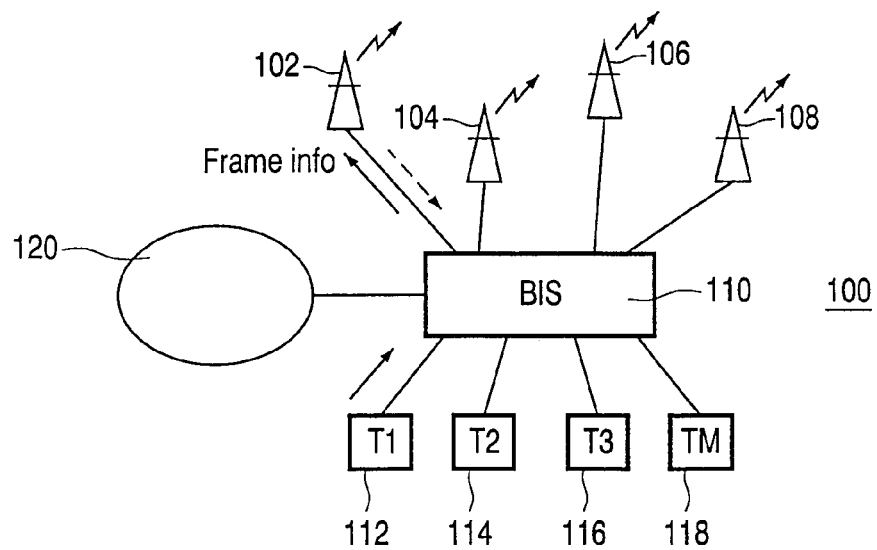
FIG. 2 is a schematic diagram of a series of devices in a linked beacon infrastructure.
FIG. 3 is a chart illustrating a portion of the transmission of a train of inquiry access codes centred on a given frequency.

FIG. 2 is a diagram of such a system 100 of linked beacons embodying the invention and providing an implementation of an infrastructure for use in, for example, department stores, shopping malls, theme parks, etc. The system 100 comprises a plurality of beacons 102, 104, 106, 108 distributed over a series of locales. Each of the beacons 102-108 broadcasts one or more short-range inquiry signals in a time-slot format as described in greater detail hereinafter. The beacons 102-108 are controlled by a beacon infrastructure server (BIS) 110, with one or more terminals 112, 114, 116, 118 being connected to the server 110. The terminals 112-118 enable service providers, i.e., the users of beacons 102-108, to author or edit allocated service slots in the form of added data piggy backed on inquiry facilitation signals transmitted by beacons 102-108. A service provider may lease a beacon or one of the beacon's service slots from the infrastructure provider. To this end, server 110 provides simple HTML templates for filling out by the user via one of terminals 112-118. Having filled out the template with, for example, a description of the service and other information for the data to be carried via the beacon broadcast, the template is returned to server 110, preferably via a secure link using, e.g., Secure HTTP (S-HTTP) or Secure Sockets Layer (SSL). SSL creates a secure link between a client and a server, over which any amount of data can be sent securely. S-HTTP is designed to transmit individual messages securely. Server 110 then creates the appropriate additional data package for appending to the inquiry signal of a relevant one of the beacons 102-108 based on the information submitted with the template. The system 100 may further comprise an application server 120 to assist in carrying out various functions, as will be readily understood by the skilled reader.

Referring back to FIG. 1, a strong candidate technology for the wireless link necessary for at least the 'push' mode of the above-described CA system is Bluetooth, on the grounds that it is expected to become a component part of a large number of mobile telephones 10. In analysing the Bluetooth protocol for CA broadcast or 'push' mode utilisation, a problem may be seen. In the ideal case, the terminal 10 will detect fixed beacons 12, 14 and extract basic information from them without the terminal 10 needing to transmit at all. However, this type of broadcast operation is not supported by the current Bluetooth specification.

In part, the incompatibility follows the frequency hopping nature of Bluetooth beacon systems which means that, in order for broadcast messages (or, indeed, any messages) to be received by a passing terminal, the terminal has to be synchronised to the beacon in both time and frequency. The portable device 10 has to synchronise its clock to the beacon clock and, from the beacons identity, deduce which of several hopping sequences is being employed.

To make this deduction, the portable device has conventionally been required to join—as a slave—the piconet administered by the beacon as piconet master. Two sets of procedures are used, namely "inquiry" and "page". Inquiry allows a would-be slave to find a base station and issue a request to join the piconet. Page allows a base station to invite slaves of its choice to join the net. Analysis of these procedures indicates that the time taken to join a piconet and then be in a position to receive information from the master could be several tens of seconds, which is much too long for CA applications, where a user may move out of range of a beacon before joining could be completed.

The difficulty of receiving broadcast data from beacons is caused at least partially by the frequency-hopping nature of Bluetooth and similar systems. The Bluetooth inquiry procedure has been proposed specifically to solve the problem of bringing together master and slave: the applicants have recognised that it is possible to piggy-back a broadcast channel on the inquiry messages issued by the master. Only CA terminals need read the broadcast channel messages and only CA base stations or beacons send them. In consequence, at the air interface, the mechanism is entirely compatible with conventional (non-CA) Bluetooth systems.

Figure 4:
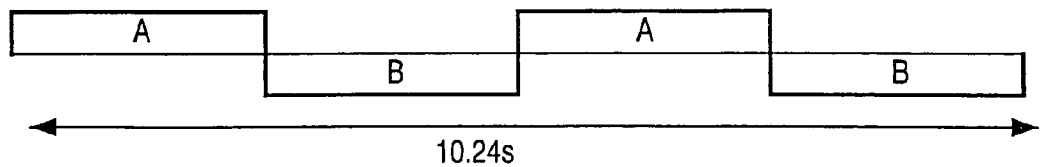
FIG. 4 illustrates alternation between trains of inquiry messages over the duration of an inquiry broadcast.

To illustrate how this is implemented, we first consider how the Inquiry procedures themselves operate, with reference to FIGS. 3 and 4. When a Bluetooth unit wants to discover other Bluetooth devices, it enters a so-called inquiry substate. In this mode, it issues an inquiry message containing a General Inquiry Access Code (GIAC) or a number of optional Dedicated Inquiry Access Codes (DIAC). This message transmission is repeated at several levels; first, it is transmitted on 16 frequencies from a total of 32 making up the inquiry hopping sequence. The message is sent twice on two frequencies in even timeslots with the following, odd timeslots used to listen for replies on the two corresponding inquiry response hopping frequencies. Sixteen frequencies and their response counterparts can therefore be covered in 16 timeslots, or 10 ms. The chart of FIG. 3 illustrates the transmission sequence on sixteen frequencies centred around f{k}, where f{k} represents the inquiry hopping sequence.

The next step is the repetition of the transmission sequence at least $N_{inquiry}$ times. At the very least, this requires 256 repetitions of the entire sequence which constitutes a train of transmissions which we will refer to as inquiry transmission train A. Next, inquiry transmission train A is swapped for inquiry transmission train B consisting of a transmission sequence on the remaining 16 frequencies. Again, the train B is made up of 256 repetitions of the transmission sequence. Overall the inquiry transmissions cycle between transmissions of train A and train B. As shown by FIG. 4, the specification states that this switch between trains must occur at least three times to ensure the collection of all responses in an error-free environment. This means that an inquiry broadcast could take at least 10.24 seconds.

One way to reduce this would be for the switch between inquiry transmission trains to be made more rapidly, i.e. without waiting until the 2.56 seconds for 256 repetitions of the 10 ms to cover the 16 timeslots is up. This may suitably be accomplished by setting the systems to switch over if no inquiry message is detected after say 50 ms, on the understanding that no such message will be detected in the remainder of the present train.

A portable device that wants to be discovered by a beacon enters the inquiry scan substate. Here, it listens for a message containing the GIAC or DIAC's of interest. It, too, operates in a cyclic way. It listens on a single hop frequency for an inquiry scan period of $T_{w\_inquiry\_scan}$. This must be long enough to cover the 16 inquiry frequencies used by the inquiry. The interval between the beginning of successive scans must be no greater than 1.28 seconds. The frequency chosen comes from the list of 32 making up the inquiry hopping sequence.

On hearing an inquiry containing an appropriate IAC, the portable device enters a so-called inquiry response substate and issues a number of inquiry response messages to the beacon. The beacon will then page the portable device, inviting it to join the piconet.

Figure 5:
FIG. 5 illustrates the insertion of a packet of broadcast data within an existing transmission slot.

As mentioned above and shown in FIG. 5, the applicants propose that the inquiry messages issued by the base station have an extra field appended to them, capable of carrying a user-defined payload (CA DATA). In the CA scenario, this payload is used to carry broadcast information, or keys, to CA terminals during the inquiry procedure. By adding the field to the end of the inquiry message, it will be appreciated that non-CA receivers can ignore it without modification. In addition, by using a CA-specific DIAC, CA receivers can be alerted to the presence of the extra information field.

The presence of the extra data field means that the guard space conventionally allowed at the end of a Bluetooth inquiry packet is reduced. However, this space—provided to give a frequency synthesiser time to change to a new hop frequency—will be generally unused otherwise, as current frequency synthesisers are capable of switching at speeds which do not need extension into the extra guard space. The standard inquiry packet is an ID packet of length 68 bits. Since it is sent in a half-slot, the guard space allocated is (625/2−68)=244.5 µs (625 µs slot period, 1 Mbit/s signalling rate). Modern synthesisers can switch in much less time with figures of 100 µs or lower considered routine by experts in the field. Applicants therefore propose allocation of 100 bits as a suitable size for this new field, although it will be readily understood that other field sizes are, of course, possible.

CA handsets can receive the broadcast data quickly without being required to run through a lengthy procedure to join a piconet. In addition, since there is no need for the handset to transmit any information whatsoever, there is a consequent power saving that will be particularly important in dense environments where many CA base stations may be present. Nevertheless, when the handset is in interactive mode and wishes to join a piconet in order to obtain more information, it may employ the default inquiry procedures as normal. There is no loss of functionality through supporting the additional data field.

In a typical embodiment, four of our 100 bits will be lost as trailer bits for the ID field; this is a consequence of it being read by a correlator. Of the 96 bits remaining, applicants preferred allocation is that 64 be used as data and 32 as a 2/3 FEC (forward error correction) checksum, although the checksum, any headers included, and other overheads may greatly reduce the number of bits available for data, perhaps to 10 bits or fewer in some circumstances. Each inquiry burst thus contains 8 bytes of broadcast data. In a most common scenario, by the second group of A and B trains the portable device has found the base station, understood it to be a CA beacon and is awaiting the broadcast data. Since it will be listening specifically, the portable device will at least be able to read 256 bursts of data twice (A and B), giving us two lots of 2 Kbytes, or 4 Kbytes in total.

Figure 6:
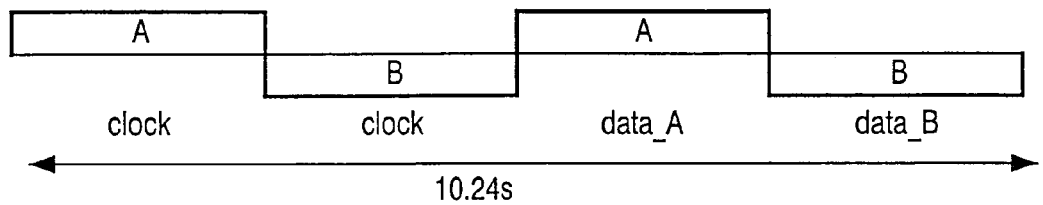
FIG. 6 illustrates a first arrangement for sending beacon clock data in a sequence of inquiry message trains.

At this stage, the portable device does not know the phase of the beacons clock because this information is not been transmitted. To assist the portable device, clock information is transmitted in at least some of the trains in the first A and B groups, as shown in FIG. 6, together with some auxiliary information indicating when the next switches between A and B will occur. This clock information will be transmitted in place of the CA broadcast data so means are provided to discriminate between the two data channels. Use of separate DIAC's is one possible method.

In the case where the portable device knows the timing of the beacon, the portable devices also knows how it will hop, which gives the ability to track all transmissions of a train. Since there are 16 transmissions in a frame, then the resultant CA channel has 16 times as much capacity and can convey 64 Kbytes of information.

Figure 7:
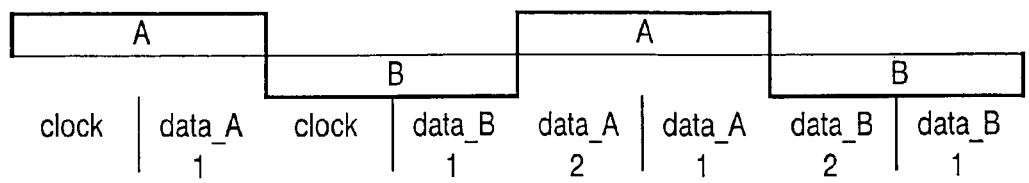
FIG. 7 illustrates an alternate arrangement to that of FIG. 6 for the sending of beacon clock data.

Since the terminal wakes up every 1.28 seconds or less, it will generally have obtained the clocking information it needs by the half way mark in the first A or B periods. Switching from clock to data at these halfway marks, as illustrated in FIG. 7, provides a number of useful advantages. Firstly, some data can be received in less than five seconds from the start of the inquiry procedure. Secondly, the terminal can still respond to an important key by automatically issuing an inquiry response message to the base station (if that is the appropriate action for the terminal to take) even if the key appears comparatively late in the cycle. It will be noted that no increase in capacity is assumed.

In the foregoing, a portable device will receive all the additional data field packets on one of the 32 inquiry channels, thereby using only 1/32 of the available bandwidth. As will be recognised, if the uncertainty as to when a portable terminal (beacon slave) receives the first inquiry packet can be overcome, the predetermined nature of the hopping sequence may be accommodated and the full bandwidth therefore utilised. For a slave to synchronise with a masters inquiry hopping sequence from the point where it received the first packet, the slave needs to know both the masters clock offset and the position of the first received packet in the masters hopping sequence. In the following example, it is assumed that the master follows the Bluetooth minimum enquiry procedure, which comprises 256 repetitions of the 16-channel inquiry hopping sequences, with three train switches (as in FIG. 4). Each sweep across the 16 channels takes 10 ms.

An alternative method of synchronising the slave hopping is to transmit clocking data in every broadcast field. The additional data field (BCD; FIG. 1) carries 4 bytes containing the following information:

Master clock offset (2 bytes);

Number of full train repetitions (1 byte)—assuming that a full train consists of 256 repetitions of 10 ms trains, the range of this parameter is 0-255 (before the inquiry switches to the next full train). This indicates to the slave when the master will next switch the full train.

How many full train switches have been completed in the current inquiry cycle (1 byte)—this data indicates to the slave what the master is likely to do at the end of the current full train, i.e. whether it will switch over to another full train or whether the inquiry procedure will terminate.

As long as no channel repeats in the 10 ms train, no field is required to indicate the position of the current channel in the hopping sequence as the slave is able to derive this from knowledge of the sequence.

From the foregoing it will be seen that, by adding 4 bytes to each additional field packet, the slave can then pick up all additional field packets to the end of the inquiry, whilst still having 4 bytes available (from our preferred assignment of 64 from 100 bits for data) to carry broadcast data.

Considering a complete beacon signal, it will be readily understood that it will need to be divided into a number of 4-byte packets with one being sent with each inquiry packet. Assuming a fixed length of beacon signal for the purposes of illustration, at 16 kB the full signal can be accommodated on a single inquiry train (a train being 256 repetitions of the 16-channel hop sequence, giving 256*16*4 bytes=16 kB).

Extending this, by fixing that the first packet of a beacon signal goes on the first packet of an inquiry train, from the message indicator field for the number of repetitions for the current 16-channel hopping sequence in the message header, the slave is enabled to derive the position of the beacon packet it has received in the complete beacon signal.

Mobile CA devices may be provided with location aware applications. Such applications generally require actual location information, as opposed to just location specific information. Therefore we now discuss the issue of transferring such location information to a portable terminal.

In principle, by using a Bluetooth link, location information can be transferred over a short-range air interface allowing (Bluetooth enabled) location aware products to find out where they are. Such products can therefore establish their position using data originating from location establishing devices such as a GPS receiver, or other devices providing a source of location information. Therefore, the products themselves do not need to be equipped with potentially expensive and sometimes unreliable onboard location systems. Unfortunately, the transfer mechanism suffers from the above mentioned problems resulting from the fact that before information can be transferred, a Bluetooth link needs to be established. Establishing such a link requires a Bluetooth slave terminal (in this case the terminal making the location information request), to join the piconet administered by the Bluetooth master terminal (in this case the terminal responding to the enquires). The process of joining the piconet can take several tens of seconds. While this is happening the terminal does not know its current location and the operation of any location aware applications on the terminal will therefore be impaired. Therefore this approach is not ideal for providing location information to a context aware device—a mobile CA device may not spend enough time near a given beacon to establish a Bluetooth link. Furthermore, even if a device does carry out the establishment of a Bluetooth link, there will not necessarily be any location information available and the exercise will have been a wasted exercise.

We therefore propose that the presently described concept of establishing a broadcast channel from beacons for reception by CA devices, by adding data to inquiry transmissions should include the procedure of including location information as part of the information broadcast on that channel.

As described above, initial proposals assume that each inquiry burst can carry 8 bytes of broadcast data in the extended field. Some of this will be used for synchronisation purposes so that there will be in the order of 4 to 6 bytes remaining. A typical location information packet requires approximately 12 to 15 bytes to convey basic service information, such as latitude/longitude co-ordinates and a few other parameters. For extended service purposes, the location information will typically require in the order of 15 to 300 bytes allowing information such as velocity information, optional auxiliary text and URL fields to be carried. In either case, the information may need to be spread over several packets. Basic service location information may be broadcast more often than extended service information. Optionally, extended service information may be retrieved over a normal Bluetooth connection in a 'client pull' type operation as a result of the basic broadcast indicating to the client that such extended service information is available.

In order to distinguish location information from other types of broadcast information (for example, other context aware mobile phone services or broadcast audio), two possible techniques include the following. The first is to use a special DIAC. A second, is to include a header somewhere in the additional data field to describe the information content type. In the presently described embodiment, we shall assume that the entire basic service location information burst is spread over four extended inquiry packets, although this is not to be interpreted as a limitation to the present invention.

The order of the inquiry transmissions from the master has already been discussed in some detail above, with two sets of sixteen frequencies being covered in 'trains' of inquiry transmission. In each train, all 16 frequencies in the set are covered in 10 ms and this cycle is repeated 256 times (see FIG. 4 and the relevant discussion above). Each train may be repeated twice.

Since the slave scans on a single frequency arbitrarily chosen from the set of 32 frequencies, it is useful to send location information on every frequency used for inquiry transmissions. Assuming that we require four extended fields on each frequency, the location information burst will take 40 ms and about 1.6% of the total broadcast capacity to send.

For fast location acquisition, it is assumed that the beacon must be active continuously. Such activity would normally prevent conventional two-way links being set up but this obstacle can be overcome by employing two beacons operating in tandem, thereby providing fast access to the piconet and an unlimited two-way throughput capacity simultaneously. Such an arrangement is the subject of our pending UK patent application number GB0015452.6 entitled "Local Data Delivery through Beacons" filed on 26 Jun., 2000.

The number of times location information is transmitted in a train can affect the access time to location information. By increasing the frequency of location information transmission in a train, speed of access to information can be improved. Assuming that one location information burst is sent per train, then the access time ranges from 0 to 5.12 seconds (the longer time results when the slave just misses the location information broadcast within the train and must wait for the duration of the remaining part of train A, all of train B and a portion of the next train A before if is possible to pick up the location information).

If it is known to a terminal receiver (slave receiver) that inquiry information is broadcast on each of 16 frequencies, say every 10 ms, and it is monitoring those frequencies every 10 ms, and after say 50 ms the receiver has not managed to pick up any inquiry transmissions at all, it can choose to switch to monitoring those other 16 inquiry transmission frequencies associated with the other train.

If, in the absence of received inquiry transmissions on one of the inquiry transmission trains, the receiver is allowed to jump frequency to one in the other inquiry transmission train, access time to information carried in the additional data field, for example location information, might be reduced. The reduced time may be, for example in the order of 2.56 seconds. Transmitting the burst twice per frame brings this down to, say, 1.28 seconds maximum or 640 ms average.

It will be apparent that the location information may take a number of forms in both the format location information is represented and in the format it is broadcast. For example, the information may be represented in terms of mapping co-ordinates, Global Positioning System data, or any other suitable way. Location information may be absolute or relative. In the latter case location information may be expressed, for example, with reference to building room designations, vehicle identity (say, when a person is on a bus) or in other ways as will be apparent to the person skilled in the art.

From reading the present disclosure, other modifications will be apparent to persons skilled in the art. Such modifications may involve other features which are already known in the design, manufacture and use of fixed and portable communications systems, and systems and components for incorporation therein and which may be used instead of or in addition to features already described herein. As an example, rather than the foregoing scheme of having 4 clock and 4 data bytes in every broadcast packet, other arrangements may be used: an arrangement of 2 clock and 6 data bytes in 15 out of every 16 packets (with 4 clock and 4 data bytes in every sixteenth packet) improves the data carrying capability without necessarily detracting from the synchronisation performance.

The invention claimed is:

1. A communications system comprising at least one beacon device capable of wireless message transmission and at least one portable device capable of receiving such a message transmission, wherein the beacon is arranged to broadcast a series of inquiry messages each in the form of a plurality of predetermined data fields arranged according to a first communications protocol, wherein the beacon is further arranged to add to each inquiry message prior to transmission an additional data field, and wherein the beacon is further arranged to include an indication in one of said predetermined data fields, said indication denoting the presence of said additional data field, and wherein the at least one portable device is arranged to receive the transmitted inquiry messages and read data from said additional data field, the additional data field including location information.

2. A system as claimed in claim 1, wherein the beacon is arranged to add said additional data field at the end of a respective inquiry message.

3. A system as claimed in claim 1, wherein said first communications protocol comprises Bluetooth messaging.

4. A system as claimed in claim 3, wherein a special Dedicated Inquiry Access Code (DIAC) is used to indicate the presence of location information in the additional data field.

5. A system as claimed in claim 1, wherein the presence of location information in the additional data field is indicated with header information appearing in the additional data field.

6. A system in accordance with claim 1, wherein wireless messaging system employs frequency hopping, and further wherein location data is sent on each frequency used for inquiry message broadcasts.

7. A mobile communication device for use in the system of claim 1, the device comprising a receiver capable of receiving a short-range wireless inquiry message including a plurality of data fields according to a first communications protocol, means for determining when an additional data field including location information has been added to said plurality of data fields, and means for reading the location information data from such an additional data field.

8. A device as claimed in claim 7, wherein the receiver is configured to receive messages according to Bluetooth protocols.

9. A method for enabling the user of a portable communications device to receive broadcast messages wherein at least one beacon device broadcasts a series of inquiry messages each in the form of a plurality of predetermined data fields arranged according to a first communications protocol, wherein the beacon adds to each inquiry message prior to transmission an additional data field carrying broadcast message data including location information, and wherein the beacon includes an indication in one of said predetermined data fields, said indication denoting the presence of said additional data field, and wherein the portable device receives the transmitted inquiry messages including the location information and reads the broadcast data from said additional data field.

10. A method as claimed in claim 9, wherein the beacon adds said additional data field at the end of a respective inquiry message.

11. A method as claimed in claim 9, wherein said first communications protocol comprises Bluetooth messaging.

* * * * *